United States Patent [19]
Ames

[11] Patent Number: 5,271,076
[45] Date of Patent: Dec. 14, 1993

[54] METHOD PROVIDING OPTIMUM OPTICAL TRAINS ALIGNMENT IN A PASSIVE MULTI-CHANNEL FIBER OPTIC ROTARY JOINT

[75] Inventor: Gregory H. Ames, Gales Ferry, Conn.

[73] Assignee: The United States of America as represented by the Secretary of the Navy, Washington, D.C.

[21] Appl. No.: 956,328

[22] Filed: Oct. 5, 1992

[51] Int. Cl.⁵ .............................................. G02B 6/26
[52] U.S. Cl. ........................................ 385/26; 385/34; 385/36; 359/900
[58] Field of Search ................. 385/25, 26, 34, 36; 359/900; 29/833, 868, 869

[56] References Cited

U.S. PATENT DOCUMENTS 3,829,195  8/1974  Rawson ................................ 385/25
4,872,737  10/1989  Fukahori et al. .................. 385/25

FOREIGN PATENT DOCUMENTS

1-54406  3/1989  Japan ................................... 385/25

Primary Examiner—Rodney B. Bovernick
Assistant Examiner—John Ngo
Attorney, Agent, or Firm—Michael J. McGowan; Prithvi C. Lall; Michael F. Oglo

[57] ABSTRACT

A method is disclosed for use in the fabrication of a passive multi-channel optical fiber rotary joint having an axis of rotation and of the type in which optical fiber communication channels are coupled via bilaterally symmetrically disposed miniature-collimation-lenses as collimated beams to one and the other sides of an image-derotation-prism-and-prism-rotational-drive-subassembly prism which rotates at a predetermined ratio of the relative rotation of the sides of the rotary joint to derotate optical propagation paths across the transverse rotary interface associated with the respective ones of the miniature collimation lenses. Each channel at each side of the rotary joint includes a fiber and lens junction at which a ferrule encased fiber termination couples to the axially outwardly disposed face of the miniature collimation lens. A lens array holding piece serves as the mount for this junction. Each array piece is provided with a locality of axial engagement at the adjacent side of the image derotation prism of the image-derotation-prism-and-prism-rotational-drive subassembly.

11 Claims, 4 Drawing Sheets

METHOD PROVIDING OPTIMUM OPTICAL TRAINS ALIGNMENT IN A PASSIVE MULTI-CHANNEL FIBER OPTIC ROTARY JOINT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The instant invention is directed to a method providing optimum optical trains alignment of optical fiber communication channels in a passive multi-channel fiber optic rotary joint, and more particularly, to such a method that provides proper component positioning in joints between ferrule encased optical fiber terminations and cylindrically bodied miniature collimation lenses that passes signals on multiple, single-mode or multi-mode, optical fiber channels across a continuous rotary interface with low loss, low crosstalk between channels, and low reflection of light back into the input fibers.

(2) Description of the Prior Art

The method, or process, of the present invention has primary utility in connection with the optimization of optical train alignment in optical fiber rotary joints, and especially satisfies a requirement arising in connection with multiple channel optical fiber rotary joints. Multiple channel rotary joints for multi-mode fibers have been developed but exhibit high optical loss and variation of loss with rotation. Additionally, the extreme tolerances associated with single-mode fibers preclude the easy adaptation of rotary joints to handle single-mode fiber. The tight tolerances required by single-mode fibers generally result in excessive loss or excessive variation of loss with rotation. Rotary joints for single-mode fiber have been developed, but are limited to a single on-axis fiber. There are devices which actively align the output fibers to track the input fibers, but these are complicated, require electrical power, and do not allow operation in both directions.

Typically in the heretofore known rotary joints for multi-mode fibers, ferrule encased optical fiber terminations were simply mechanically inserted into associated lens holders for cylindrically bodied miniature collimation lenses and without use of any optical train alignment technique.

SUMMARY OF THE INVENTION

For purposes of providing a better understanding of the method of the present invention, this summary starts with a description of a type of rotary joint device, for which the present method providing fiber optic communication channel alignment has special applicability. Namely, a passive multi-channel fiber optic rotary joint is disclosed by which a large number of fibers, whether multi-mode or single-mode, and corresponding signals, may be passed limited only by the acceptable dimensional magnitudes of the rotary joints volume envelope. Light may travel in either direction through the joint and the joint may be rotated continuously in either angular direction about its axis of rotation. In accordance therewith, a first array, or end subassembly for supporting optical fiber terminations joined to their respective associated cylindrically bodied miniature collimation lenses is mounted to a stator, and a second such array or end subassembly is mounted for rotation with respect to the stator. An image de-rotating prism or other image de-rotating element is mounted for rotation between the first and second arrays. The rotating second array and the rotating image de-rotating prism rotate relatively to each other about a axis of rotation at a preselected rotation ratio relative to each other. At each of the first and second arrays, the ferrule encased fiber terminations are butt ended into the adjoining face of its respective associated cylindrically bodied miniature collimation lens and made fast thereto by a suitable fiber optic beam transmissive adhesive medium which is strong and durable when it hardens. The ferrule which encases the fiber termination may be of glass, ceramic or other equivalent material.

Firstly, the end face of each ferrule encased fiber termination is longitudinally positioned at a preselected single-coordinate location along a linear axis parallel to the lens central axis of the associated cylindrically bodied collimation lens (and co-parallel with the axis of rotation), and which single-coordinate location is behind (i.e. relative to the direction of fiber to lens beam) the focal point of the lens. (Stated in terms of the rotary joint axis of rotation, the direction of the single coordinate location from the focal point of the lens is axially outwardly beyond the focal point, with the origin of such axis defined to be at the optical midpoint of the optical train of which the joint is part, namely somewhere in the de-rotation prism). In one embodiment that preselected location is at the end face of the lens, the lens having been processed by being polished to reduce its length from a pre-processed deliberately excessive length to a decreased post-processed length at which the aforesaid preselected axial location coincides with the lens face of the post-processed lens. In this embodiment the ferrule encased optical fiber termination butts against the lens face. The arrangement of fiber and lenses in the first and second array are in mirror image relation to one another, and the aforesaid preselected single-coordinate longitudinal (or axial) locations of the fiber end faces relative to the focal points of the lenses are chosen to provide coupling of a maximum amount of optical power through the optical train of the rotary joint assembly, which includes the axially opposite mirror image arranged miniature collimation lenses and the intervening image derotation prism.

Secondly, each ferrule encased fiber termination is laterally (or stated, in relation to the axis of rotation, radially and azimuthally) positioned relative to the adjoining respective cylindrically bodied miniature collimation lens to pass through a preselected two-coordinate location in a transverse reference plane. (Note that it could be equivalent to state that the lateral positioning of the fiber termination is relative to the end face of the miniature lens). The aforesaid reference plane may be regarded, as transverse to each of the optical axes of the optical fibers, the optical axes of the miniature collimation lenses, and the axis of rotation of the rotary joint assembly; all of which axes are co-parallel. The reference plane may be regarded as passing through the end face of the ferrule encased fiber termination. The preselected two-coordinate location for each fiber termination is chosen such that a beam path in an optical fiber couples with a nearly collimated (this nuance is the subject of later delated description) beam path emerging at the opposite side of the miniature collimation lens that is normal to first and second transverse rotary interfaces between the first array and the derotation prism and between the second array and the derotation prism, respectively.

The miniature collimation lenses have beam diameters which are larger than the beam diameters of corresponding optical fibers. The first and second rotary interfaces are each implemented by a circular-race and roller ball type thrust bearing. It will be appreciated that this configuration does not strictly provide a geometrically definite rotary interface. However, as a generality this configuration provides a rotary interface which operates transversely relative to the axis of rotation. It will also be appreciated that at least a part of the circular-race roller ball type thrust bearing provides a locality of axial engagement which defines a transverse reference plane that is employed in the aforesaid lateral positioning of the ferrule encased fiber terminations relative to the respective cylindrically bodied associated miniature collimation lenses. (Note that it could equivalently be stated that the lateral positioning of the fiber termination is relative to the adjacent face of the miniature lens). The aforesaid preselected rotation ratio is implemented by a planetary gearing system which provides a relative 2:1 rotation ratio. The passive multichannel fiber optic rotary joint exhibits low loss and low crosstalk for both single-mode and multi-mode optical fiber communication channels, and is capable of implementation for any number of optical fibers limited only by the acceptable dimensional magnitudes of volume envelopes for the first array, the second array, and the derotation prism.

In accordance with objectives of the present invention, a novel method providing longitudinal and lateral positioning of the ferrule encased optical fiber terminations to the their respective associated miniature collimation lenses is disclosed that provides nearly collimated optical beams emitted therefrom that are normal to respective ones of the first and second transverse rotary interfaces between the first array and the image de-rotating prism, and between the image de-rotating prism and the second array, respectively. In accordance therewith, the ferrule encased fiber terminations are in a first procedure longitudinally positioned relative to their respective associated cylindrically bodied miniature lenses to provide emission of nearly collimated light beams from the axially inward sides thereof that are optimum for purposes of coupling optical power through the total optical train of the rotary joint. In the second step of the procedure, the fiber terminations are laterally aligned to such respective lenses to cause the nearly collimated beams emitted from the other sides of the lenses that are normal to their array's locality of axial engagement, and therefore normal to the transverse rotary interfaces. (Note that the aforesaid longitudinal and lateral positioning of a fiber termination could equivalently be stated a positioning relative to the adjacent face of the miniature lens). Illustrative of the procedure for longitudinal positioning is an optical bench procedure employing a commonly batch processed lot of pre-processed lenses having lengths deliberately incrementally longer than a quarter pitch by a small predetermined amount. Use of the lenses in the rotary joint is simulated in an optical bench, using samples from the lot. Cycles of (1) shortening a pair of samples by polishing a lens face of each by a matched amount, and (2) measuring the optical power coupled through the simulation set-up, are successively performed. The measurements are interpreted to determine the post-processed length of a lens which places the aforesaid selected single-coordinate longitudinal location, whereat the end face of the fiber connection is located, at the face of the lens. The other lenses of the lot are re-sized to the determined post processed length. Illustrative of the procedure for lateral positioning is an optical bench procedure involving a plano-convex lens and a screen at the plano-convex lens's focal point at its convex side. As a calibration step a beam is projected normally against the planar face of the plano-convex lens to define an alignment target on the screen. Then the locality of axial engagement of an array is maintained in abutting contact with the planar side of the plano-convex lens and a beam is individually projected through each optical fiber while sweeping the optical fiber laterally with respect to end face of the miniature collimation lenses until the collimated light beam emerging from the opposite side of the lens is coincident with the alignment target. Each of the ferrule encased optical fiber terminations is made fast to the corresponding miniature collimation lenses at the preselected longitudinal and lateral positions employing a suitable optical adhesive, which hardens to form a durable optical and structural joint.

BRIEF DESCRIPTION OF THE DRAWINGS

Other objects, features, and advantages of the present invention will become apparent as the invention becomes better understood by referring to the following detailed description of the illustrative embodiments thereof, and to the drawings, wherein.

DETAILED DESCRIPTION OF THE PREFERRED EMBODIMENTS

Figure 1:
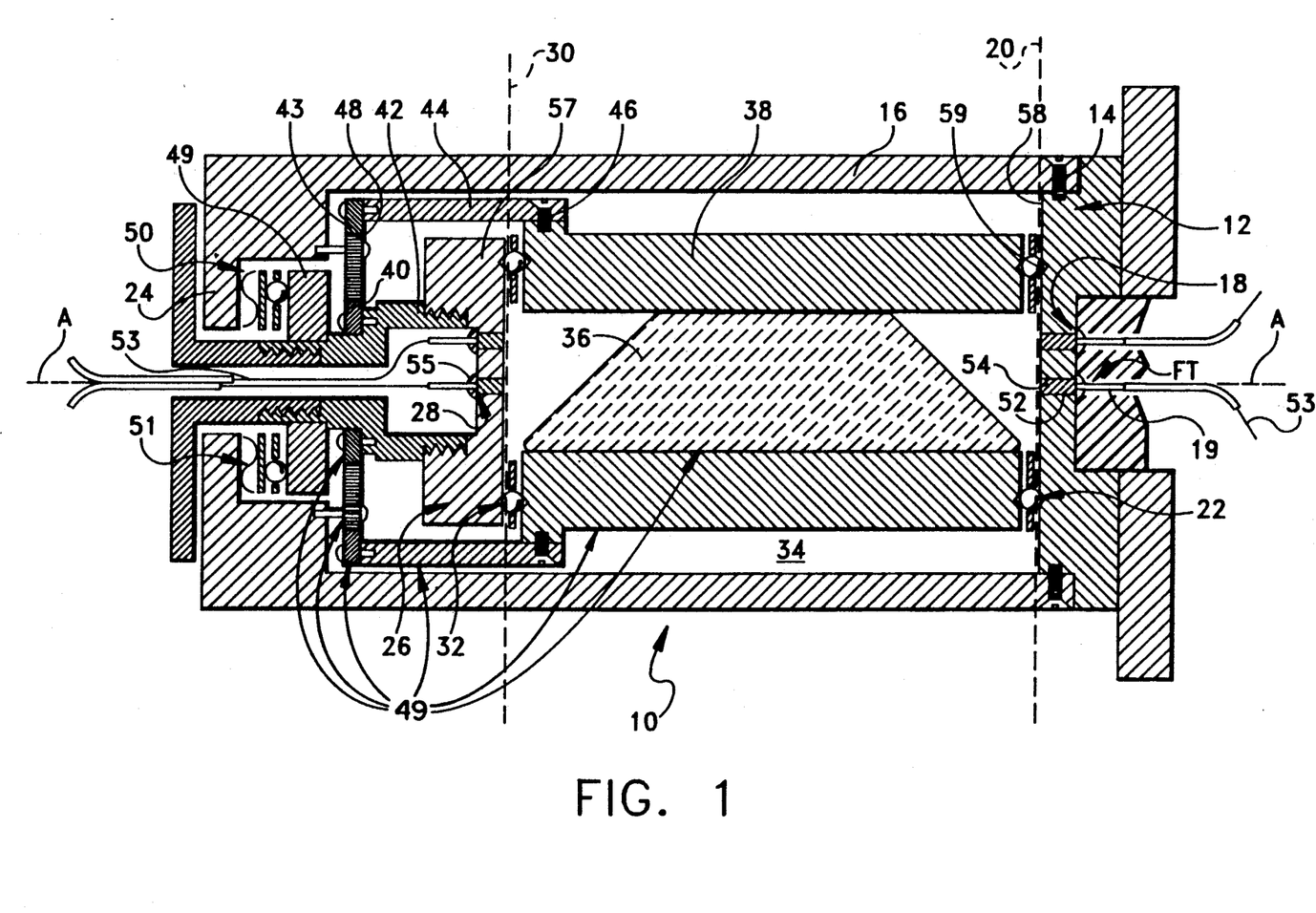
FIG. 1 is a longitudinal sectional view of a multiple optical fiber rotary joint illustrative of apparatus which may be manufactured utilizing the method of the-present invention.
Figure 2:
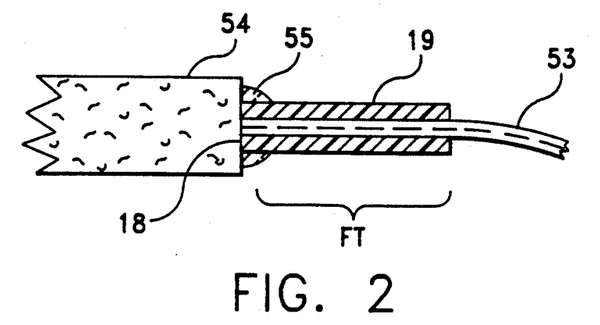
FIG. 2 is an enlargement of one of the regions of a joint between a ceramic ferrule encased optical fiber termination and a cylindrically bodied miniature collimation lens in FIG. 1.

Referring now to FIG. 1, generally designated at 10 is a longitudinal sectional view illustrative of a multiple optical fiber rotary joint assembly, with regard to which the method of the present invention may be employed. The rotary joint assembly 10 includes a first stationary array piece, or fibers and lenses interconnection subassembly, generally designated 12. Subassembly 12 is fastened, as by threaded members 14, to one end of a cylindrical stator member 16. The function of array piece 12 is to hold and support one or more adhesively-held-together fiber and lens joints, generally designated 18, best seen in FIG. 2, between a ceramic ferrule encased optical fiber terminations FT (best seen in FIG. 2) and a respective cylindrically bodied miniature collimation lenses. The ferrule 19, best seen in FIG. 2, which encases the fiber termination may be made of glass, ceramic or other equivalent material. The array piece 12 contains one such joint 18 for each fiber optical communication channel coupled by rotary joint assembly 10. More specific details concerning the ferrule encased optical fiber termination FT and concerning the cylindrical bodied miniature collimation lens will be described later herein. The present section of this specification emphasizes the relation of the adhesively-held-together joints, or junctions, 18 to a first relative rotational motion transverse interface (or simply transverse rotary interface) schematically illustrated by dashed line 20. The parts of rotary joint assembly 10 rotate relative to an axis of rotation A, whose origin (not shown) is defined to correspond to the midpoint of the optical trains through rotary joint assembly 10. (As will become apparent later herein, this places the origin of axis A at the middle of image derotation prism 36). Relative motion takes place across transverse rotary interface 20 between array piece 12 and the parts of rotary joint assembly 10 disposed in the axially inward direction therefrom. Optical beams (not shown) consisting of optical fiber beams transformed into nearly collimated beams by the miniature collimation lenses of fiber and lens joints 18 propagate across interface 20 along beam paths perpendicular to transverse rotary interface.

In the embodiment illustrated in FIG. 1, first transverse rotary interface 20 is constituted by roller bearing and V-groove assembly (more generically termed a circular-race and roller ball type thrust bearing) generally designated 22 that permits continuous 360° rotation of the structures engaging the opposite sides of interface 20, although other transverse rotary interface implementations presenting insignificant frictional resistance may be employed as well without departing from the scope of the instant invention. It will be appreciated that constituting a rotary interface by means of a circular-race and roller ball thrust bearing does not nicely geometrically define an interface. However, as a generalization this configuration must be said to provide a rotary interface which operates transversely relative to the axis of rotation, and hence the term "transverse rotary interface" is apropos.

A flange 24 is formed at the other end of the cylindrical stator 16 spaced from and confronting the first stationary array piece 12 against which a second rotating array piece (or fiber and lens interconnection subassembly) generally designated 26 is rotatably mounted in a manner to be described. The function of second rotating array piece 26 is to hold and support a like set adhesively-held-together fiber and lens joints end generally designated 28. In the axially inward direction from array piece 26 there is a second rotary interface 30. Second rotary interface 30 is constituted by a like V-groove and roller bearing assembly generally designated 32 to permit continuous 360° rotation of the structure engaging the axially inward side of assembly 32, relative to the second rotating array piece 26.

It is to be appreciated that the sets of fiber and lens joints 18,28; which are respectively held and supported by first and second array pieces 12, 26 have corresponding angular (or central in the case of a fiber and lens joints which may be aligned along axis A) positions about axis A in the respective array pieces. The pairs of corresponding fiber and lens joints 18, 28 in the sets in one and the other array pieces 12 and 26 implement individual fiber optical communication channels of the multiple channels which rotary joint assembly 10 couples.

In the innerspace generally designated 34 defined between the first and second array pieces 12 and 26, a derotation prism 36 is carried by a prism rotor 38 that is mounted for rotation on the roller bearing and V-groove assemblies 22 and 32 that constitute the transverse rotary interfaces 20 and 30. The prism 36 preferably is a Dove prism, although other suitable image derotating prisms such as a Pechaum prism or other optical element may be employed as well.

A star gear 40 is mounted for rotation with the second rotating array piece 26 via annular member 42 threadably fastened thereto, and an internal ring gear 43 is mounted for rotation with the prism rotor 38 via annular sleeve 44 attached to the prism rotor 38 as by threaded members 46. A plurality of planetary gears 48, which are rotatably supported by shafts extending from the flange 24 of the stator 16, are mounted between and in mechanically ganged relation to both the star gear 40 and internal ring gear 43. A flange 49 is mounted for rotation with the annular member 42 threadably fastened to the second rotating array piece 26, and a thrust bearing assembly generally designated at 50, which is resiliently biased by a spring 51, is provided between and abutting the flange 24 of the stator 16 and the flange 49 to maintain all the localities of axial engagement between the stator, prism rotor and second rotating array piece in longitudinal or axial compression under the relative rotation of the second rotating array piece 26 and stator 16. In the preferred embodiment, the planetary gears 40, 43, 48 provide rotation of the second rotating array piece 26 relative to the rotation of the prism rotor 38 at a 2:1 rotation ratio to provide image de-rotation of each of the one or more optical communication channels. It will be appreciated that image derotation prism 36, prism rotor 38, internal ring gear 43, annular sleeve 44, and planetary gears 48 constitute an image-derotation-prism-and-prism-rotational-drive-subassembly 49 to derotate optical propagation paths across the transverse rotary interfaces 20, 30 associated with respective array pieces 12, 26. The principle of providing image derotation between optical signal channels by providing a derotation prism between relatively rotating beam channels, which derotation prism is geared to rotate at one half of the beam channels, speed of relative rotation is per se old, as disclosed by a commonly assigned U.S. Pat. No. 4,109,998 to M. L. Iverson, entitled "Optical Slip-rings". While planetary gearing is shown in the presently preferred embodiment, other mechanical arrangements can be used to mount the second rotating array piece and prism rotor for relative rotation without departing from the inventive concept.

Reference is again made to FIG. 1, this time to describe in greater detail the constrictions of held-together-by-adhesive fiber and lens joints 18, 28; and the relationship of fiber and lens joints 18, 28 to first and second array pieces 12, 26, first and second transverse rotary interfaces 20, 30, and roller bearing and V-groove assemblies 22, 32. One of the elements which forms a fiber and lens joint 18, 28 is a ferrule encased optical fiber termination FT consisting of a ferrule 19 with the axially extending marginal end portion of an optical fiber 53 extending centrally therethrough and presenting an end face of the optical fiber 53 as one of the parts of the optical joints 18. The ceramic ferrule, which is convention and well known, provides a structural support to the optical fiber termination FT and the ferrule material is chosen to enable their precision polishing as an integral unit to form a precision tolerances transverse end face. Another of the elements forming a joint 18,28 is cylindrical bodied miniature collimation lens 54, which is mounted in a corresponding cylindrical lens receiving aperture 52 which extends between opposite sides of array pieces 12, 26. The end faces of the encased optical fiber termination FT is jointed to the face of miniature collimation lens 54 which appears at the axially inward side of the array 12 or 26 that supports the joint, by means of optically transparent epoxy cement, diagrammatically indicated by an exaggerated bead 55 of adhesive. As is to be described later herein in greater detail, fiber termination FT is butting against the face of collimation lens 54, which location cooperates with the length of lens 54 in the following respect. Lens 54 is sized in length to exceed a quarter pitch for the wavelength of optical beam for which rotary joint 10 is designed, by a predetermined increment of longitudinal distance to the lens focal point (within the body of the lens). The predetermined increment of longitudinal distance to the focal point is chosen in accordance with a relationship of the longitudinal between spacing, between the end face of an optical fiber 53 and the focal point of lens 54 versus optical power coupled through the optical train of rotary joint assembly 10. Further the position of fiber termination FT relative to cylindrical bodied miniature collimation lens 54 is determined by a relationship between lateral relative position of the end face of an optical fiber 53 to the cylindrically bodied lens versus the angle of emergence or incidence at the axial inward side of the lens of a beam coupled to optical fiber 53, using the array piece's (18's or 26's) locality of axial engagement as a reference for purposes of making the determination.

Figure 3:
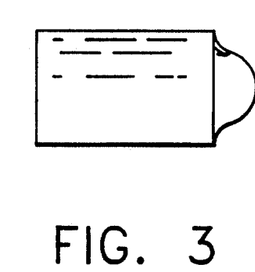
FIG. 3 is a side elevation of a type of cylindrically bodied collimation lens employed in an alternate embodiment of the invention.

As is conventional with regard to held-together-by-adhesive joints 18 of ferrule encased optical fiber terminations and miniature collimation lenses 54 in an optical fiber communication channel applications, a light beam coupled through the optical fiber 53 to the miniature collimation 54 lens exits the lens as a collimated beam (or as in connection with the present invention a nearly collimated beam) whose optical beam diameter is larger than the optical beam diameter within the optical fiber. The expanded nearly collimated beams extending across the first and second transverse rotary interfaces 20, 30 insure that light present along any of the optical fibers 53 of the one or more optical signal communication channels across rotary joint assembly 10 will couple with low-loss and low-crosstalk, which in turn permits the arraying of a large number of communication channels by array pieces 12, 26. The number of communication channels which an array piece may implement is essentially limited only by acceptable dimensional magnitudes of the volume envelopes of the array pieces 12, 26, and of the image derotating prism 36. Multimode step-index fiber, multi-mode graded-index, single-mode, and polarization preserving fiber may be employed. The lenses preferably are gradient index rods, such as SELFOC lenses which are supplied by the Nippon Sheet Glass Company, which has a business address at Somerset, N.J. SELFOC is a trademark of the Nippon Sheet Glass Company. However, other types of lenses which may be employed include an aspherical type lens, shown in FIG. 3, which feature correction for spherical aberration and therefor reduces the loss associated with separation between opposing lenses.

As will become apparent in subsequent sections of the specification describing the alignment process, the axially inwardly disposed faces of the body members 56, 57 of arrays 12,26 are formed with a precision tolerances planar surface 58 transverse to axis of rotation. The walls of the circular V-grooves which form part of the circular races of bearing assemblies 22, 32 constitute the localities of axial engagement of array pieces 12, 26. Further as will become specifically apparent from subsequent descriptions herein of the alignment method, these localities of axial engagement define a reference plane which represents transverse rotary-interfaces 20, 30 in the process of aligning the lateral position of the ferrule encased optical fiber terminations FT relative to the axially outward face of cylindrically bodied miniature collimation lenses 54.

Figure 4:
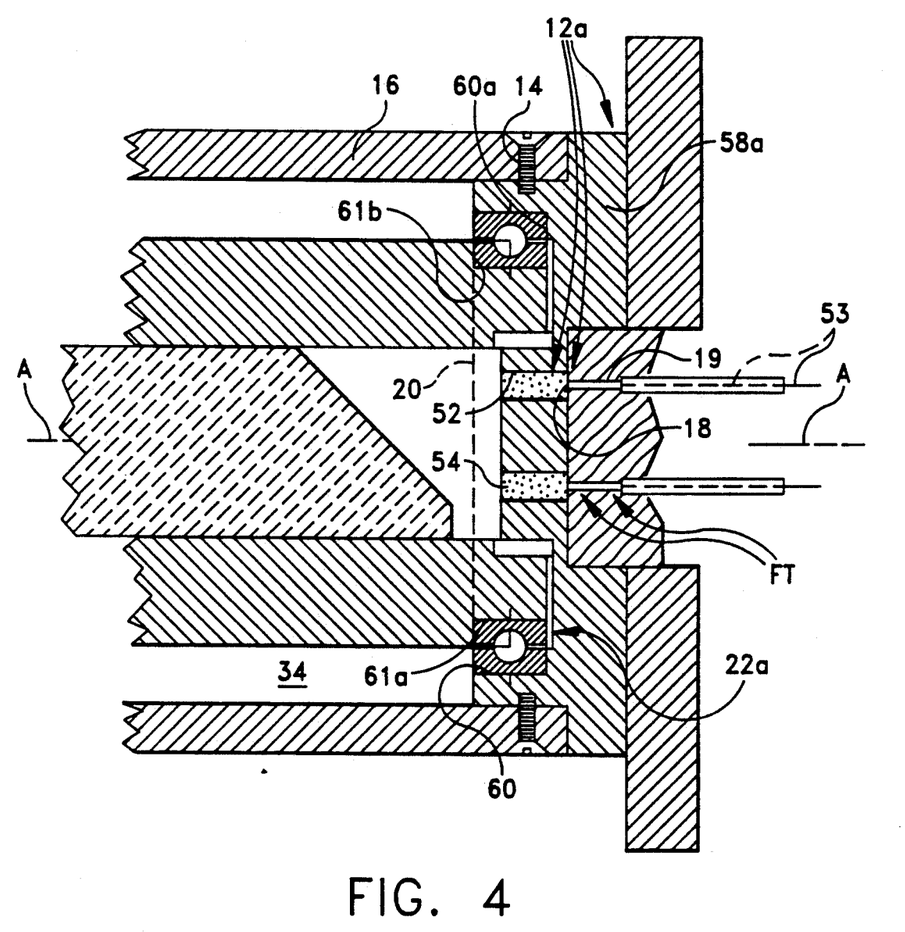
FIG. 4 is a fragmentary longitudinal sectional view like FIG. 1 illustrating an alternative embodiment of a multiple optical fiber rotary joint.

Referring now to FIG. 4, insofar as the invention is presently understood, is an alternate embodiment which constitute the best mode of practicing the invention. In FIG. 4 components which essentially correspond to those previously described relative to FIG. 1 are given a like reference numerals. However, in this alternate embodiment transverse rotary interface 20 (and also 30, but not shown) between array piece 12a and prism rotor 38a is facilitated by means of a commercially procured circular race and roller ball bearing assembly 22a. Bearing assembly 22a is of a premium grade which has precision tolerances in connection with its dimensions including circularity. The body member 58a of array piece 12a is configured to form an axially extending cylindrical bore surface 60 and a shoulder 60a with precision tolerances. The outer race of bearing assembly 22a is force fitted within bore surface 60 and against shoulder 60a. Prism rotor 38a has formed thereon at its adjacent marginal end portion a reduced diameter axially extending cylindrical surface 61a which at its axially inward end terminates at a shoulder 61b. The latter shoulder 61b is also formed with precision tolerances as a transverse planar surface. It is to be appreciated that for purposes of the process described later herein of lateral positioning of each ferrule encased optical fiber termination FT relative to the associated cylindrically bodied miniature collimation lens 54, the edge of the inner race of assembly 22a constitutes the locality of axial engagement (being in contact with shoulder 61b).

In accordance with the method of the present invention an order of sequence is followed of (1) firstly the ferrule encase fiber termination FT being positioned longitudinally to place optical fibers (53's) end face at a preselected location relative to the cylindrically bodied collimation lens 54, and (2) then the fiber termination FT being laterally position relative to lens 54.

In performance of the longitudinal positioning, the preselected location needs to be empirically determined. Illustrative of a practice for determining the preselected longitudinal location is the following, which can be employed for embodiment of rotary joint 10, FIG. 1 in which miniature collimation lenses 54 are of the gradient index rod type. This type of lens is cylindrical in shape and performs all bending of the light by its index variation rather than by a shaped surface. They are procured with a pre-sized length sufficiently longer than a quarter pitch at the wavelength the optical fiber beam rotary joint assembly 10 is designed to couple so that light which enters one side of the lens is focused to a focal point near the opposite face of the lens, but located within the lens.

The essence of the procedure is to polish a face of the lens to reduce its length, so that when the ferrule encased fiber termination FT is butted thereagainst such end face of the optical fiber, will be at a preselected location leaving the focal point of the lens axially inwardly spaced therefrom within the body of the lens. However, a factor to consider in implementing this practice is variations between individual gradient index, rod type lenses. In their manufacture they are batch processed. Their batch-to-batch fabrication tolerances have been found not sufficiently consistent to predict the appropriate lens length to give optimum coupling as between different manufacturing batches. However, consistency within a given batch is sufficient that if the optimum length is empirically determined by "cut and try" for sample lenses from the batch, the length will be reasonably close to optimum for the entire procured lot of all lenses from the same manufacturing batch.

Accordingly, a pair of pre-sized lenses of the batch are employed as batch calibration samples to determine a re-sized lens length which will cause an abutting ferrule encased fiber termination FT to be at the preselected longitudinal location. This is done by polishing the pair to various lengths and measuring the optimum coupling through the optical train of rotary joint assembly which is achievable at each lens length with fiber terminations FT butted to the lenses. More specifically, the batch calibration lenses are polished to matching lengths, measured by a micrometer. Ferrule encased fiber terminations FT are then individually attached to corresponding individual sample lenses with optical epoxy such that the end face of the fiber terminations FT abut the face of the sample lens with the fiber located approximately in the center of the lens. In effect, this provides a matched pair of calibration samples of held-together-by-adhesive fiber and lens joints 18. The pair of calibration samples of joints 18 are then mounted in an optical bench in a relation of bilateral symmetry to one another (mirror image relationship), separated by distance corresponding to the optical length of the propagation path between transverse rotary interfaces 20, 30 (i.e., through derotation prism 36) to simulate the optical train of rotary joint assembly 10. Using the capabilities of the optical bench, the angular alignment between the individual samples is fine tuned to achieve maximum coupling between the fibers. The optical loss at maximum coupling is recorded. The fibers are then removed from the lenses and the lenses cleaned with a solvent to remove the epoxy. The lenses are polished to a new shorter length and the process is repeated. Through multiple steps of this process a plot of optical loss versus lens length is obtained, for a given batch of lenses with regard to a given optical length of propagation path separating transverse rotary interfaces 20, 30. This plot is then interpreted to determine the re-sized length of lens which results in minimum optical loss when a fiber end portion is abutted against the lens face. Other lenses of the batch may be prepared for use as lenses 54 in rotary joint 10 by polishing them to this optimum length.

It will be appreciated that in accordance with the aforesaid practice the preselected longitudinal location at which the fiber terminations end face is identified as a single-coordinate location along a linear reference axis (not shown) relative to the focal point axially outward side of the miniature collimation lens. Moreover, in terms of geometric relationships, this longitudinal reference axis (not shown) is co-parallel with Axis A of rotary joint assembly 10. This is by virtue of determining the re-sized length of the lens employing a simulation set up (not shown) of rotary joint assembly's optical train, which inherently involves the set up having an axis that corresponds to Axis A.

The feature of the method of this invention of positioning ferrule encased fiber termination FT axially outwardly beyond the focal point of the miniature collimation lens 54 to which the fiber termination is to be joined, has a basis in theory. It can be shown that when using expanded beam coup-ling, where two fibers are coupled by use of two lenses in a symmetrical arrangement, the maximum degree of coupling is not achieved when the fiber faces are located at the lens focal points. Optimum imaging of the first fiber face onto the second face would dictate that the fiber faces should be located at the focal point, thus providing a collimated beam between the lenses. However, the objective in an optical fiber optic connection in a fiber optic communication channel is to couple a maximum amount of optical power and not to maintain an optimum image. It can also be shown, using a Gaussian beam optics formalism, that in a symmetric arrangement of fibers and lenses, the longitudinal position for the fibers relative to the lenses which gives optimal coupling is a position slightly spaced axially outwardly beyond the focal point. This additional distance is dependent upon the separation between the two lenses. The further spaced apart the two lenses are, the further must the fibers be beyond the lens focal points. It will be appreciated that in an arrangement to provide maximum coupling, the resultant beam will not strictly be a collimated beam. However, it will be "nearly collimated".

Figure 5:
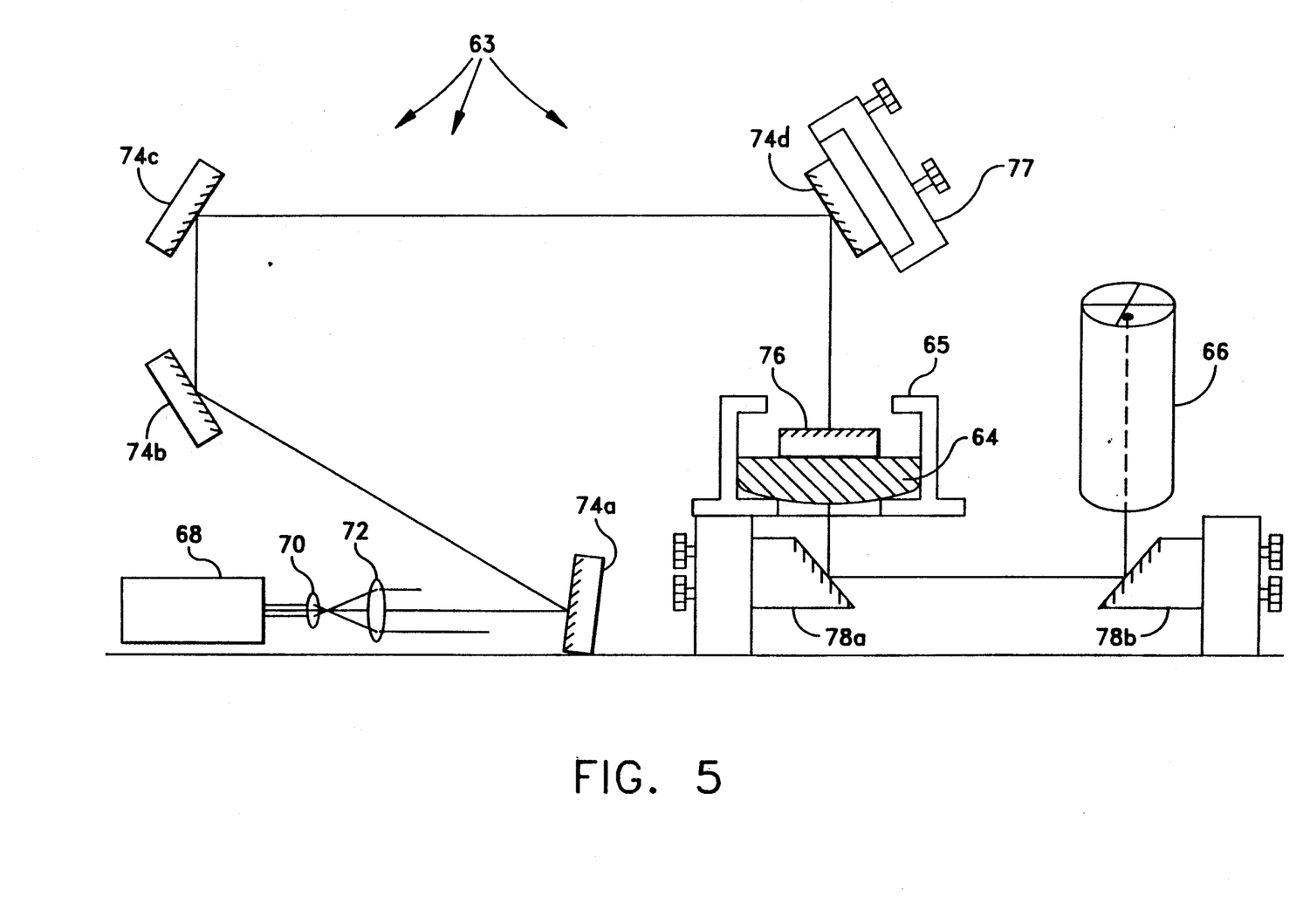
FIG. 5 is a diagrammatic view of a configuration of optical bench type apparatus employed in the present invention during an apparatus calibration procedure.
Figure 6:
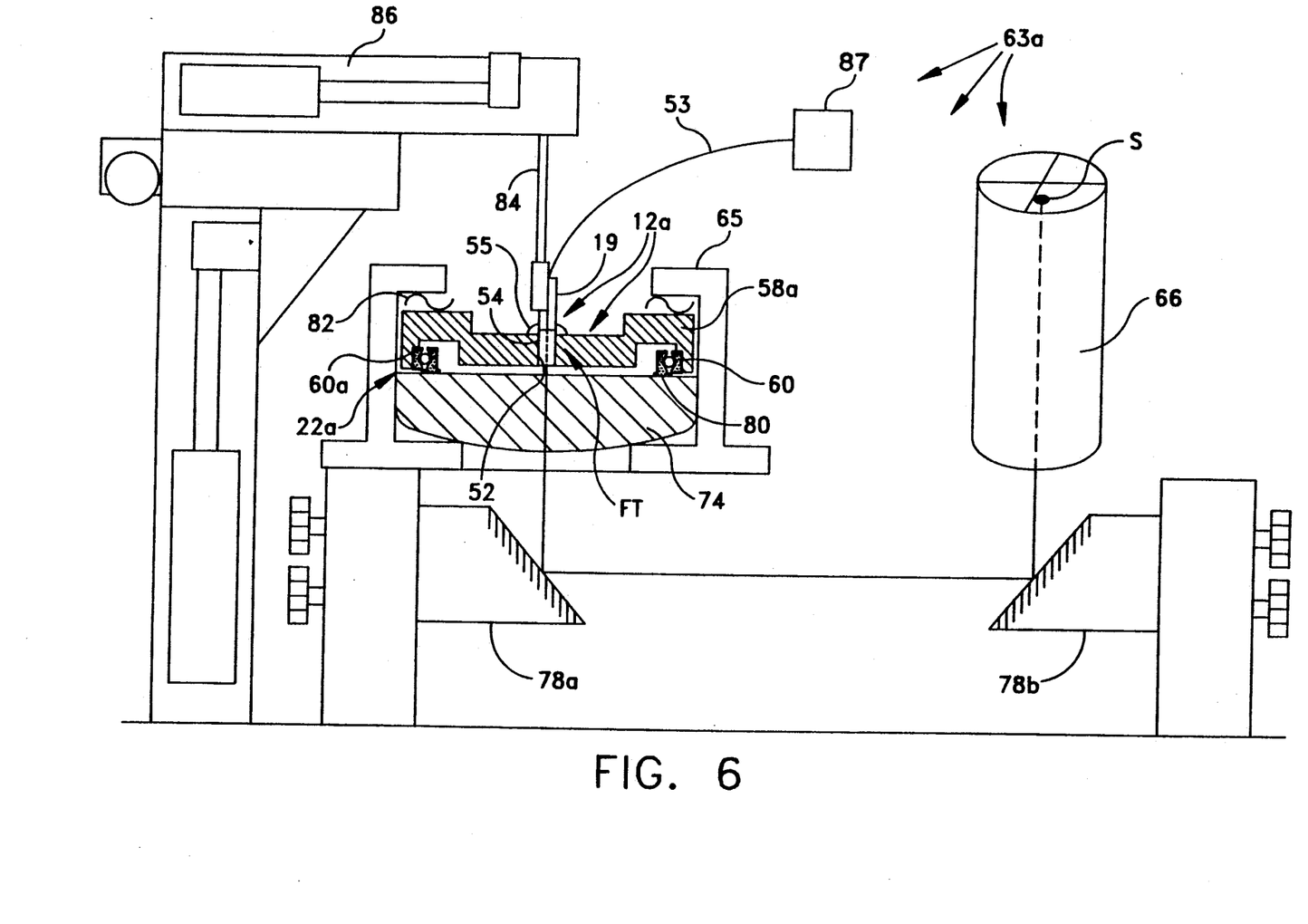
FIG. 6 is partially a diagrammatic view, with a part thereof a longitudinal section of the optical bench apparatus of FIG. 5 during a procedure for laterally positioning a fiber termination relative to a cylindrically bodied collimation lens.

Reference is now made to FIGS. 5 and 6 for a an illustrative practice for determining the preselected lateral position of optical fiber 53. FIG. 5 depicts a calibration practice which is initially be performed upon an optical bench set up 63, so that any collimated light beam which is precisely perpendicular to the planar surface of the plano-convex lens 64 held by a fixture 65 will form a substantially focused spot on the center of cross-hairs on an infrared and visible light sensitive display screen 66 which is located substantially at the focal point at the convex side of lens 64. A beam from a visible light laser 68 is expanded to a larger diameter beam by lenses 70 and 72. This expansion is done to reduce the divergence angle of the beam. The beam is directed over a considerable distance by several mirrors 74a, 74b, 74c, and 74d, to fall upon a partial mirror 76. Mirrors 74a, etc., are optional and function solely to fold the long optical path into a reasonable size room. Partial mirror 76 is manufactured with precise parallelism between its two faces. Thus as it rests on plano-convex lens 64, the upper surface of partial mirror 76 is precisely parallel to the planar surface of plano-convex lens 64. The laser beam is reflected from partial mirror 76. A two axis mirror mount 77 is used to tilt mirror 74d to cause the laser beam to strike the partial mirror 76 precisely perpendicular to its upper mirrored surface. When the laser beam and the surface of partial mirror 76 are precisely perpendicular, the laser beam is retro-reflected so that it traces the same path back to the laser 68. The coincidence of the outgoing and reflected beams in the vicinity of lenses 70 and 72 is the evidence that perpendicularity of beam and partial mirror surface 76 has been achieved. Usually there is enough dust on lenses 70 and 72 to cause scattering of light, and this enables the position where the beams strike the lenses to be seen with the unaided eye. Otherwise a card with a hole in it may be used near lens 72 to pass the outgoing beam and view the reflected beam. The mirror mount 77 is adjusted until the spot due to the reflected beam overlaps the spot from the outgoing beam.

Once the laser beam is perpendicular to the surface of the partial mirror 76, and to the planar surface of the lens 64 by virtue of the parallelism of the partial mirror 76, the portion of the beam which passes through the partial mirror is focused by the plano-convex lens upon viewing screen 66. Orthogonally disposed two-axis mirrors 78a and 78b are tilted so that the focused spot on the screen is centered on cross-hairs or other target. As will become apparent, the cross-hairs now constitute a rotary joint assemble optical trains alignment target. This completes the calibration practice.

Reference is now made to FIG. 6 for the practice directly involving determination of the preselected lateral position of the each ferrule encased fiber termination relative to the collimation lens 54 to which it is to be joined. FIG. 6 depicts a portion 63a of the previous optical bench set up (63, FIG. 5) which is employed for this practice. The formerly shown partial mirror (76, FIG. 5) which rested in the plano-convex lens 64 during the calibration practice is replaced by array piece 12a (of the form identified as the inventor's best mode of invention depicted in FIG. 4). However, for clarity in discussing concepts, array piece 12a in FIG. 6 is depicted in a somewhat simplified form. Specifically, only a single lens receiving aperture is shown extending through array piece 12a, it being understood that in multiple channel rotary joint assembly 10, the array piece has a set of more than one lens receiving apertures 52. The outer race of circular-race and roller ball bearing assembly 22a is attached to array piece 12a by a force fit within reference alignment cylindrical bore surface 60 and against shoulder 60a. The inner race rests on a small spacer 80 which rests on the plano-convex lens 74. A spring 82 serves as a resilient force against array 12a in a direction which corresponds to Axis A of rotary joint assembly 10, and seats roller ball bearing assembly 22a against the spacer 80. Optical fiber 53 is conventionally epoxyed into a ferrule 19 and the end face of this subassembly is conventionally polished. Ferrule 19 is held in a holder 84 attached to the three axis stage 86. Stage 86 is used to move the ferrule encased optical fiber termination FT until its polished face is butted to the face of the miniature collimation lens 54, completing the longitudinal alignment and enabling the start of the lateral alignment. A modicum of slack is provided in butting the fiber termination FT against lens 54, to accommodate subsequent lateral positioning of the fiber termination and the previously applied optically transparent epoxy between the fiber termination FT and lens 54 acts as a lubricant during subsequent lateral movement. A laser 87 that emits approximately at the design wavelength of rotary joint assembly 10 is coupled into the fiber 53. This light is guided to the miniature lens 54, from which it is emitted as a collimated beam. This beam is focussed by the plano-convex lens to a spot S at viewing screen 66. The stage 86 is used to align fiber ferrule 19 (and in turn fiber termination FT) in two axes transverse to the axis of the miniature collimation lens 54. This transverse alignment of the ferrule encased optical fiber termination changes the angle at which the beam exits miniature collimation lens 54, and in turn changes the location of the spot S on screen 66. The ferrule encased fiber termination FT is swept along the surface of the face of lens 54 (aided by the lubrication effect of the epoxy cement which is still in liquid state) until spot S is in registry with,-or centered in, the cross-hairs, or rotary joint assembly optical trains alignment target, on the screen 66. At that time the beam exiting the miniature lens 54 is precisely perpendicular to the planar surface of the plano-convex lens, and hence to the abutting surface of the inner circular-race of roller ball bearing assembly 22a. As noted hereinabove in connection with FIG. 2, the surface of the inner circular-race constitutes the locality of axial engagement of array piece 12a, which defines a transverse reference plane representing transverse rotary interface 20. Therefore the ferrule encased fiber termination FT is positioned at the desired preselected lateral location (i.e., by coordinates of a two-dimensional reference set of coordinates lying in a plane transverse to axis A, corresponding to the positioning implemented by adjustment of two axes of three axis stage 86) causing coupled beams which exit or enter the axially inward face of collimation lens 54 to be perpendicular to transverse rotary interface 20. The epoxy is allowed to harden.

The heretofore disclosed embodiments of the invention have featured an embodiment in which the ferrule encased fiber terminations FT have butted against the lens face of the miniature collimation lens 54 to which joined, with the length of lens 54 such that the preselected longitudinal location for optimum coupling of power occurred at the lens face. However, it is to be understood that the principles of the invention also apply where the preselected longitudinal location is axially outwardly beyond the face of lens 54 and the end face of fiber termination FT is spaced from the face of lens 54. In fact, it has been found that the distance between a miniature lens's focal point and the preselected location axially outwardly therebeyond is sufficiently small to enable joining a spaced apart fiber termination FT to the face of the lens 54 by flowing optical epoxy therebetween, and allowing same to harden. The determination of the specific preselected longitudinal location for the end face of encased fiber termination FT could be achieved by any suitable optical bench practice involving simulation of bilaterally symmetrically arranged, held together by adhesive fiber and lens joints 18 separated by an optical distance equal to that between transverse rotary interfaces 20 and 30, using a back reflection technique with a photodetecting beam power measuring device tapped into the beam by a beam splitter.

Many modifications of the presently disclosed invention will become apparent to those skilled in the art without departing from the scope of the instant invention.

What is claimed is:

1. A method for producing encased-optical-fiber-termination to cylindrically-bodied-miniature-collimation-lens junctions such that optimum optical train alignment is provided in a rotary joint for coupling at least one optical fiber communication channel across a relative rotation joint about an axis of rotation, each of the at least one communication channels being coupled between opposed rotary joint end subassemblies as a beam through a prism-and-prism-rotational-drive-means for causing the derotation of optical propagation paths about said axis, said optical propagation paths being between the opposed end subassemblies, which prism-and-rotation-drive-means rotates at a predetermined ratio of the rotation between the end subassemblies, and which prism-and-rotation-drive-means has predetermined distance of beam propagation characteristics, each end assembly for each communication channel serving to support a corresponding at least one such junction with its collimation-lens housed in an associated cylindrical lens receiving aperture extending therethrough, the axis of rotation of the rotary joint, the central linear axis of each encased-fiber-termination, the central axis of each collimation-lens, and the central axis of each lens receiving aperture all being co-parallel, each end subassembly being adapted to present to the confronting side of the prism-and-rotational-drive-means a locality of axial engagement which defines a transverse reference plane, said method comprising the steps of:

securing the cylindrically-bodied-miniature-collimation-lens of each junction in the associated lens receiving aperture of the respective end subassembly of the opposed subassemblies;

longitudinally positioning the encased-fiber-termination of each junction such that its end face is disposed at a preselected single-coordinate location along a respective another co-parallel linear reference axis, which single-coordinate location is axially outwardly spaced by a predetermined distance from the focal point of an image impinging upon the axially inward face of the associated cylindrically-bodied-miniature-collimation-lens, said axially inward direction being defined relative to a reference outward direction which is relative to the middle of the centrally disposed prism-and-prism-rotational-drive means, said predetermined distance being so chosen that substantially a maximum amount of optical power will be coupled through the associated collimation-lens, the prism-and-rotational-drive-means and the collimation-lens of the corresponding junction in the other end subassembly;

laterally positioning the encased-fiber-termination of each junction relative to the position of the associated cylindrically-bodied-miniature-collimation-lens to pass through a preselected two-coordinate location within a respective another transverse reference plane, said two-coordinate location being so chosen that a beam passing through the optical fiber will couple with a beam which is received by or emerging from the axially inward side of the collimation-lens and which is perpendicular to said first transverse reference plane; and     making fast the encased-fiber-termination of each junction to the adjacent face of the associated cylindrically-bodied-miniature-collimation-lens, employing an optically transparent adhesive which will harden to form a durable joining medium.

2. The method of claim 1, wherein the preselected single-coordinate locations along respective linear reference axes are empirically determined.

3. The method of claim 1, wherein the preselected two-coordinate locations within respective another transverse reference planes are empirically determined.

4. The method of claim 1, wherein both the preselected single-coordinate locations along the respective linear reference axes and the preselected two-coordinate locations within respective another transverse reference planes are empirically determined.

5. The method of claim 1, wherein the rotary joint couples no less than two optical fiber communication channels, and:

each preselected two-coordinate location within a respective another transverse reference plane is individually empirically determined.

6. The method of claim 1, wherein the step of longitudinal positioning of the encased-fiber-termination of each junction includes:

choosing a magnitude of length for all the cylindrically-bodied-miniature-collimation-lenses in the rotary joint which exceeds a quarter pitch for the wavelength of optical beam for which the rotary joint is designed by a predetermined-increment-of-longitudinal-distance-to-the-lens-focal-point such that said single-coordinate location lies along the axially outwardly disposed lens face of the associated collimation-lens, said focal point of an image impinging upon the axially inward lens face being disposed within the body of said collimation-lens spaced from said axially outward lens face by said predetermined-increment-of-distance; and     moving each encased-fiber-termination to a position at which its end face is separate from the face of the associated cylindrically-bodied-miniature-collimation-lens by only a modicum of slack to accommodate subsequent lateral positioning of the fiber termination and to accommodate admission between the end face of the fiber and the lens face of said optically transparent adhesive in a liquid state.

7. The method of claim 6, including:

admitting said optically transparent adhesive in a liquid state into the modicum of slack separating the encased-fiber-termination from the face of the cylindrically-bodied-miniature-collimation-lens prior to laterally positioning the encased-fiber-termination relative to the collimation-lens, whereby the adhesive serves to lubricate the encased-fiber-termination to collimation-lens interface during positioning.

8. The method of claim 6, wherein the substep of choosing of a magnitude of length for all of the miniature-collimation-lenses of each rotary joint end subassembly includes:

obtaining a lot of miniature lenses known to have been produced in single batch of manufacture and of a pre-sized length sufficient to be oversize relative to the range of possible magnitudes of lengths which would accommodate re-sizing to exceed the aforesaid quarter pitch of the wavelength by said predetermined-increment-of-longitudinal-distance-to-the-lens-focal-point;

successively performing matched polishing of a face of each of a pair of sample lenses of the lot to cause matched decreases of lens length in calibration increments, and subjecting the pair of lens at each of their calibration increment lengths to a test simulating their beam coupling function in the rotary joint, and recording the optical power coupling performance of the pair of lenses at each of their calibration incremental lengths;

interpreting the record of optical power coupling performance of pairs of samples to choose a re-sized length of lens which would constitute the length which exceeds a quarter pitch of the wavelength of optical beam for which the rotary joint is designed by said predetermined-increment-of-longitudinal-distance-to-the-lens-focal-point; and from among the remaining collimation lenses of said lot, producing the collimation-lenses needed for the junctions of each rotary joint end subassembly by polishing a face of each to decrease its length to said re-sized length.

9. The method of claim 8, wherein each collimation-lens is of the gradient index, rod type.

10. The method of claim 1, performed in conjunction with an optical bench staged alignment fixture including a plano-convex lens and a screen means at the focal point of an image impinging upon the planar side of the plano-convex lens, wherein said step of lateral positioning of the encased-fiber-termination of each junction includes:

calibrating the alignment fixture by projecting a calibration beam against the planar face of the plano-convex lens and varying the optical bench adjustments to define an alignment target at the screen means;

individually removably securing an end subassembly to the alignment fixture with the locality of axial engagement of the subassembly in abutting relationship against the planar face of the plano-convex lens; and individually projecting a beam through the encased-fiber-termination of each fiber and lens junction supported by the end subassembly, and laterally sweeping the encased-fiber-termination between various positions across the face of the associated miniature-collimation-lens until a position is found at which the beam emerging from the convex side of the plano-convex lens forms a spot substantially in registry with the alignment target at the screen means.

11. The method of claim 10 wherein the rotary joint end subassembly when part of an assembled rotary joint is rotatable about an end subassembly axis coextensive with the axis of rotation of the rotary joint, the axially inward side of the end subassembly being formed of at least a part of a circular race, roller-ball, type thrust bearing, said at least a part of which in turn forming said locality of axial engagement, and wherein the convex face of the plano-convex lens engages rigid structure of the fixture, said step of lateral positioning of the encased-fiber-termination of each junction further including:

positioning the end subassembly with said locality of axial engagement in abutting relationship against the planar face of the plano-convex lens;

applying a resilient force to the end subassembly in a direction against the plano-convex lens while a beam is projected through the encased-fiber-termination at each associated junction of the end subassembly is laterally swept across the face of the miniature collimation lens as aforesaid, whereby the engagement between the at least part of a circular race roller ball bearing and the planar face of the plano-convex lens is under compressive stress.

* * * * *